C. D. MEIGS & M. C. MEIGS.
Improvement in Grading and Ditching Scrapers.
No. 122,627.
Patented Jan. 9, 1872.
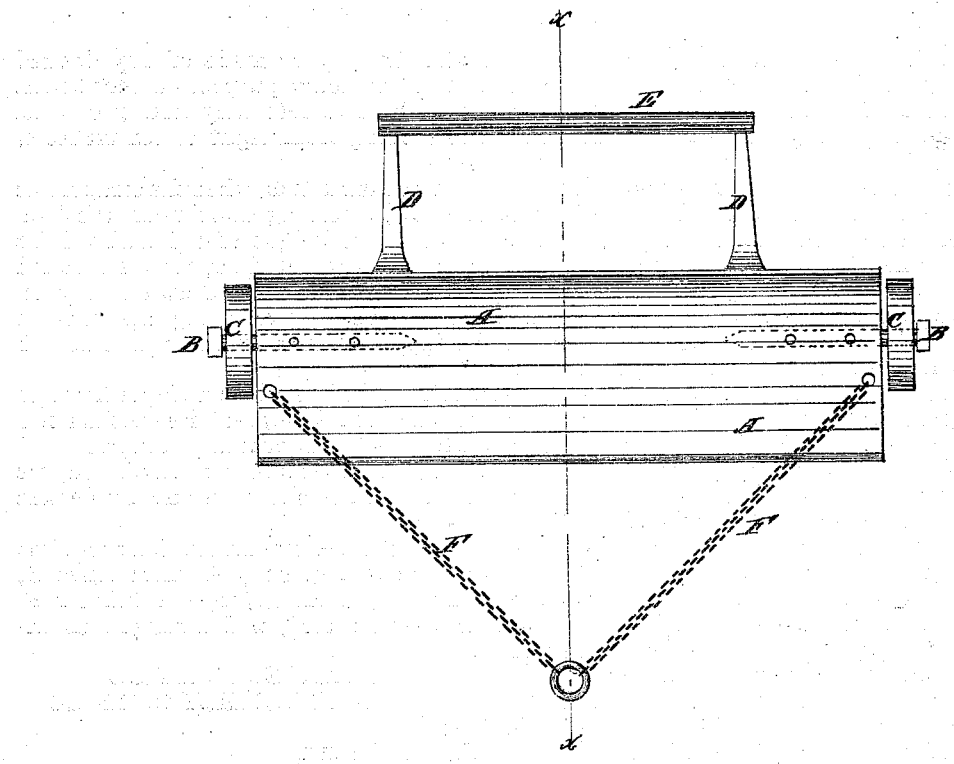
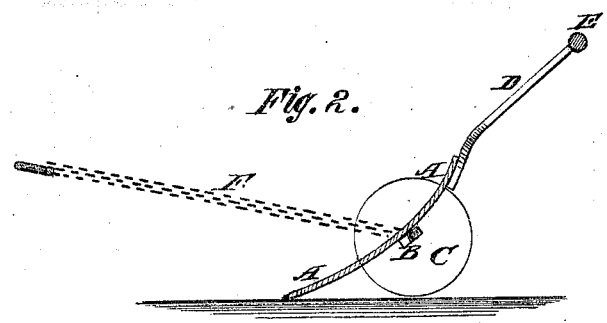

UNITED STATES PATENT OFFICE.

CHARLES D. MEIGS AND MONTGOMERY C. MEIGS, OF ROMNEY, INDIANA.

IMPROVEMENT IN GRADING AND DITCHING SCRAPERS.

Specification forming part of Letters Patent No. 122,627, dated January 9, 1872.

Specification describing a certain Improvement in Grading and Ditching Scraper, invented by CHARLES D. MEIGS and MONTGOMERY C. MEIGS, of Romney, Tippecanoe county, Indiana.

Figure 1 is a top view of our improved scraper. Fig. 2 is a detail sectional view of the same taken through the line $x\ x$, Fig. 1.

Our invention has for its object to furnish an improved scraper for grading roads, opening ditches, &c., which shall be simple in construction, inexpensive in manufacture, conveniently and easily handled, and of very light draft; and it consists in the construction and combination of the various parts of the machine, as hereinafter more fully described.

A is the body of the scraper, the rear part of which is curved upward to adapt it for receiving and holding the load. The body A may be made of metal, or of wood faced or plated with metal. To the ends of the body A are secured short axles B, upon which are placed small wheels C. To the body A are attached two handles, D, the outer ends of which may be connected by a cross-bar, E. F are the draft-chains, the rear ends of which are secured to the ends of the body A. The forward ends of the chain F are attached to a ring, to which the draft is applied.

The scraper may be made of any desired size, but for ordinary purposes a convenient size would be five feet long and two wide, the wheels being from eight to ten inches in diameter.

With this construction, when the scraper has been loaded, by bearing down upon the handles D, the entire weight of the load will be thrown upon the wheels C, so that the loaded scraper can be conveniently drawn to any desired place, when, by releasing the handles D, the scraper will turn over and thus unload itself.

This construction enables a single horse to do more work and with greater ease than two horses can do with an ordinary scraper.

Having thus described our invention, we claim as new and desire to secure by Letters Patent—

As a new article of manufacture, a one-horse scraper, composed of body A, short axles B, small wheels C, handles D E, and chains F F, combined, constructed, and arranged as described.

CHARLES D. MEIGS.
MONTGOMERY C. MEIGS.

Witnesses:
JNO. C. TYLER,
C. F. POWERS. (51)